Patented Sept. 17, 1929

1,728,721

UNITED STATES PATENT OFFICE

GEORGE C. BRYSON, OF MONTREAL, QUEBEC, CANADA

DETERGENT COMPOSITION AND METHOD OF MAKING SAME

No Drawing.   Application filed April 8, 1925.   Serial No. 21,707.

This invention relates to detergent compositions and to the method of making the same, and the object of the invention is to provide a composition which will be rapid and effective in action and will not detrimentally affect the human skin or delicate fabrics.

The composition comprises essentially water, soap, alcohol and the following ingredients or the equivalents thereof; oleic acid, glycerine, sodium hydroxide, with or without the addition of perfuming and coloring ingredients.

In order that a better understanding of the invention may be obtained, the method of combining one particular composition and the preferred proportions of the ingredients thereof will be given, but it will be understood that the invention is not confined strictly to the ingredients, proportions or method of combining, as various modifications may be made, some of which will be hereinafter specifically indicated. A proportioning of ingredients which has been found satisfactory is the following:—

| | |
|---|---|
| Water | 1200 c. c. |
| Castile soap powder | 400 grams. |
| Ethyl alcohol | 15 drachms. |
| Oleic acid, U. S. P. | 14 drachms. |
| Glycerine | 6 drachms. |
| Sodium hydroxide | 1 gram. | to which may be added as a perfume oil of bergamot, 11 drachms, and a coloring agent a trace of rosaniline chloride, say .01 gram. If hard water is used, approximately 1 gram of phenolphthalein should be added to preserve the color of the rosaniline. If other coloring matter is used, the phenolphthalein may be unnecessary or may be replaced by a suitable equivalent.

As the invention is now practised these ingredients are combined in the following manner:—

First.—Mix together water 6 drachms, alcohol 4 drachms, and add 1 gram sodium hydroxide, and heat until solution is complete; then add oleic acid 6 drachms and heat gently with gentle agitation until the jelly which the mixture forms ceases to thicken. Add 6 drachms of glycerine with shaking or agitation until an homogeneous mixture results. This mixture is then set aside.

Second.—Mix together alcohol 8 drachms and suitable coloring agent, such as rosaniline chloride .01 gram, until solution is complete and then add oleic acid 8 drachms with stirring or agitation until an homogeneous mixture results. Add to this oil bergamot 3 drachms and heat slowly to a temperature between 60° C. and 90° C., at which the mixture becomes substantially stable.

Add the hot second mixture to the first mixture with gentle stirring until homogeneity is obtained. If the coloring agent used is rosaniline and if the water to be used is hard, dissolve phenolphthalein 1 gram in 3 drachms alcohol and add the solution to the previously made mixture to preserve the color of the rosaniline. To this mixture add oil bergamot 8 drachms and shake or agitate to homogeneity. The resulting mixture is a somewhat heavy liquid.

To 400 grams of good quality, finely powdered castile soap, add slowly approximately 1200 c. c. water, working the mixture to a smooth paste. To this soap paste add gradually the previously made mixture with stirring to obtain an homogeneous mixture, which should be a paste sufficiently thin to expel easily from collapsible tubes and sufficiently thick to retain its shape. The final stirring should be slow and gentle to avoid frothing. The exact amount of water to be used depends upon the soap and can be determined only by examination of each batch of soap. The amount given is satisfactory for a commercially aged soap of good quality.

While the foregoing composition and method of making the same is preferred, it will be understood that substitutes or equivalents may be used for some of the ingredients;— for example, palmitic acid or stearic acid or other material of similar nature may be substituted for oleic acid; and some other perfuming oil, such as oil of lavender, may be substituted for the oil bergamot. The equivalents of other ingredients may be substituted; for example, the use of a soap paste containing sufficient free alkali to replace the sodium hydroxide of the composition.

Alternatively, the ingredients of the composition may be mixed with the ingredients of the soap instead of adding them to a previously made soap. While the proportions herein given are those preferred, it will be understood that some variation may be made therefrom, especially when other ingredients are substituted for those herein mentioned.

Having thus described my invention, what I claim is:—

1. A composition of matter containing water and additional ingredients approximately in the following proportions; soap 400 grams, alcohol 15 drachms, glycerine 6 drachms and the reaction products of oleic acid 14 drachms, and sodium hydroxide 1 gram.

2. A composition of matter of the consistency of stiff paste produced from ingredients approximately in the following proportions; water 1200 cubic centimeters, soap 400 grams, alcohol 15 drachms, oleic acid 14 drachms, glycerine 6 drachms, sodium hydroxide 1 gram.

3. A process of making a detergent composition of the character described, which comprises mixing water, alcohol and sodium hydroxide with heating, then adding successively oleic acid and glycerine, adding to this a mixture composed of alcohol and oleic acid, and mixing the resulting liquid with a thick soap paste.

4. A process of making a detergent composition of the character described, which comprises combining ingredients in substantially the following proportions and order; mixing together water 6 drachms, alcohol 4 drachms, sodium hydroxide 1 gram with heating to dissolve, and then adding successively oleic acid 6 drachms with gentle heating and agitation and glycerine 6 drachms with agitation; mixing together alcohol 8 drachms and oleic acid 8 drachms with shaking and with heating to a temperature between 60° and 90° C.; mixing together the first and second mixtures with gentle agitation; and finally mixing the combined mixture with a soap paste composed of pulverized castile soap 400 grams and water approximately 1200 cubic centimeters.

5. A process of making a detergent composition containing water, alcohol, oleic acid, glycerine, sodium hydroxide, characterized by the compounding of separate portions of the oleic acid, the one portion with water, alcohol, glycerine and the sodium hydroxide and the other with alcohol at a temperature between 60° and 90° C., combining the mixtures thus made, and finally adding the resulting mixture to a soap paste.

In witness whereof, I have hereunto set my hand.

GEORGE C. BRYSON.